Dec. 23, 1930. A. JORDAHL 1,786,208
DUST SEPARATOR
Original Filed Dec. 19, 1924
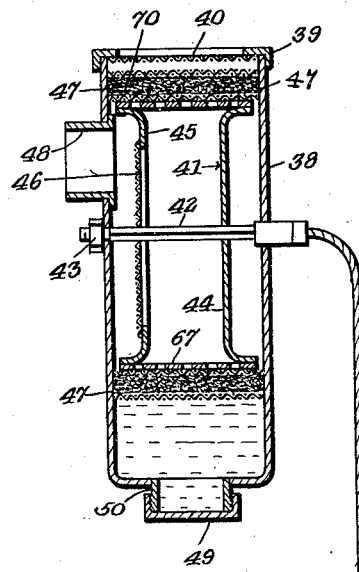
Fig. 1.
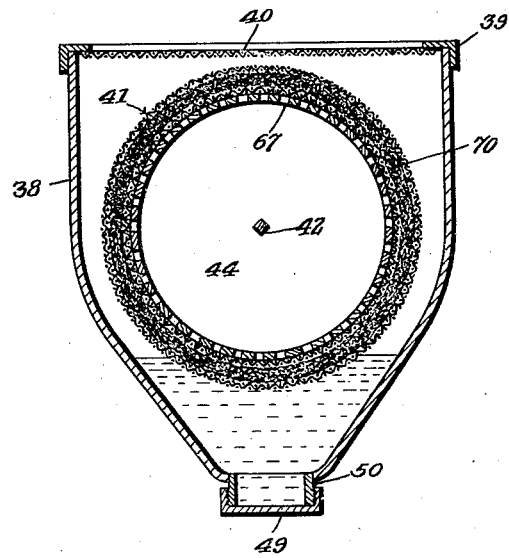
Fig. 2.
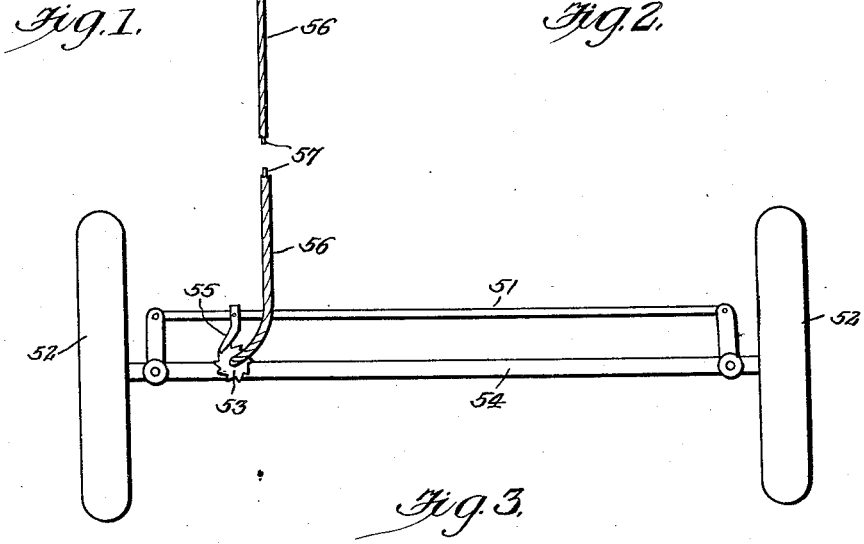
Fig. 3.
INVENTOR.
Anders Jordahl,
BY 
ATTORNEY.

Patented Dec. 23, 1930

1,786,208

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

DUST SEPARATOR

Original application filed December 19, 1924, Serial No. 757,014. Divided and this application filed November 8, 1927. Serial No. 231,952.

The present invention relates to an air and gas filter of the type in which the filter medium is self-cleaning so that the apparatus can operate continuously without the necessity of interruptions for the purpose of removing the dust and dirt which has accumulated in the filter medium. This application is a division of application Serial No. 757,014 filed December 19, 1924. It is an object of this invention to intermittently or continuously subject sections of the filter medium automatically to the cleaning action of a suitable viscous liquid or viscous which not only has the effect of cleaning the filter but also provides the filter medium with a coating of viscous or other suitable liquid so that the efficiency of the filter is greatly increased. It is a further object of this invention to provide a means such as baffles, eliminator plates or suitable screens, depending upon the capacity and service required, in the installation which are adapted to separate and retain any particles of viscous liquid which may have been carried along by the air or gas after such air has been drawn or forced through the filter medium since it has been found in actual practice that small particles of the viscous fluid are carried away in suspension with the cleaned air or gas which is objectional. A still further object of this invention is to provide a means whereby a viscous fluid is continuously applied to the filter medium which medium is preferably arranged around or forms the periphery of a rotatable drum. A further object is to provide means for rotating the drum which may be accomplished by hand or by mechanical means either intermittently or continuously, depending upon the specific service required. It is also an object of this invention to construct the filter so that it forms an airtight connection between itself and the casing in which it revolves and into which it is constructed so that the air will pass through the filter medium and not around it.

Further objects will be apparent from the following specification taken in connection with the accompanying drawings in which like reference characters indicate corresponding parts throughout and in which:

Fig. 1 is a vertical cross sectional view of a dust separator,

Fig. 2 is a longitudinal section of the separator and

Fig. 3 is a plan view showing an operator for the separator.

This separator is adapted to be used in connection with the air intake of a carburetor for an internal combustion engine or it may be used in connection with compressors or other air pumps. It consists of a casing 38 having a top piece 39 secured thereon to which is suitably secured a screen 40. A rotatable drum 41 is arranged on a shaft 42, said shaft being preferably square in cross-section so that it may rotate the drum and is provided with a nut 43 by which the shaft may be retained in said casing. The drum comprises a side disk 44 and an open side disk 45 to which a screen 46 is secured. A cylindrical perforated plate 67 is secured on the edges of the disks, as shown, and the filter 70 is suitably secured on said plate, said filter being adapted to comprise any suitable material but is shown as consisting of two screens between which a fibrous material is inserted. As indicated in Fig. 1 the filter forms an airtight joint 47 between itself and the casing 38 so that all of the air drawn through the screen 40 must pass through the filter and into the interior of drum 41. The air which passes through the filter into the drum is forced through the screen 46 and then through the outlet 48, the screen 46 being for the purpose of removing any particles of viscous liquid which may be present in suspension in the air due to the passage of the air through the saturated filter. The viscous liquid is applied and the filter is also cleaned by means of the fact that the drum rotates in a quantity of viscous liquid which is located in the bottom of the casing. This amount of viscous liquid can comprise any suitable quantity but it should preferably be enough to just reach the lower part of the perforated plate 67. The accumulated dirt as well as the dirty viscous liquid can be withdrawn from the casing by means of a screw-threaded cap 49 which is located at the lowermost portion of the casing and preferably on an extension 50.

Motion may be imparted to the drum 41 by any suitable means but for an internal combustion engine for an automobile, advantage is taken of the steering rod 51 associated with the front wheels 52. For this purpose a ratchet wheel 53 is suitably mounted on the axle beam 54 and on the rod 51 is secured a pawl 55 which is adapted to engage the teeth of wheel 53. A flexible tube 56 connects the ratchet wheel with the filter device and said tube encloses a chain or other suitable transmission device 57 for conveying the motion of the ratchet wheel to the drum 41. It is thus seen that a motion to the left by the rod 51 in steering the automobile will rotate the ratchet 53 by the engagement therewith of the pawl 55 so that the drum will be given a slight turn. By means of this intermittent motion of the drum the filter will be advantageously cleaned as well as constantly coated with the viscous liquid.

As stated in the foregoing the apparatus can be rotated continuously or intermittently depending upon the output of cleaned air required, and the viscous liquid will not only coat the filter but will also clean it. All of the particles of viscous liquid and also any particles such as parts of the filter medium which may become detached will also fly against the screen 46 and be retained thereby but will slowly flow or fall to the bottom.

I claim as my invention:

1. A dust separator for air or gases comprising a casing having a liquid in its lower portion; a rotatable drum mounted in said casing and having a filter mounted thereon in gas tight contact with the walls of the casing to prevent leakage of the gas around the filter; an inlet and an outlet in said casing for the gases which pass through the filter; means for rotating said drum in order to coat said filter with said liquid; and means for separating, from the gases which have passed through the filter, particles of the liquid carried in suspension with the gases.

2. A dust separator for air or gases comprising a casing having a liquid in its lower portion and having an inlet and an outlet for the air; a rotatable drum mounted in said casing and having a filter mounted thereon in gas-tight contact with the walls of the casing and which is adapted to pass through said liquid, the gas being adapted to pass through the filter and the gas tight contact preventing leakage of gas around the filter; means for rotating said drum to progressively coat said filter with said liquid; and means for separating, from the gases which have passed through the filter, particles of the liquid carried in suspension with the gases.

3. A dust separator for air or gases comprising a casing having a liquid in its lower portion and an inlet and an outlet for the air; a rotatable filter drum mounted in gas-tight contact relative to the end walls of said casing and being adapted to pass through said liquid, the gas being adapted to pass through the filter and the gas tight contact preventing leakage of gas around the filter; means for intermittently rotating said drum; and means for separating, from the gases which have passed through the filter, particles of the liquid carried in suspension with the gases.

4. A dust separator for air or gases comprising a casing having a liquid in its lower portion and an inlet and an outlet for the air; a rotatable filter drum mounted in gas-tight contact relative to the end walls of said casing and being adapted to pass through said liquid, the gas being adapted to pass through the filter and the gas tight contact preventing leakage of gas around the filter; means for rotating said drum; and a screen for separating, from the gases which have passed through the filter, particles of the liquid carried in suspension with the gases.

5. A dust separator for air or gases comprising a casing having a liquid in its lower portion and an inlet and an outlet for the air; a rotatable filter drum mounted in gas-tight contact relative to the end walls of said casing and being adapted to pass through said liquid, the gas being adapted to pass through the filter and the gas tight contact preventing leakage of gas around the filter; means for rotating said drum; and a screen mounted on said rotatable filter drum for separating, from the gases which have passed through the filter, particles of the liquid carried in suspension with the gases.

6. A dust separator for air or gases comprising a casing having a liquid in its lower portion and an inlet and an outlet for the air; a rotatable filter drum mounted in gas-tight contact relative to the end walls of said casing and being adapted to pass through said liquid, the gas being adapted to pass through the filter and the gas tight contact preventing leakage of gas around the filter; a ratchet and pawl mechanism for intermittently rotating said drum; and a screen mounted on said rotatable filter drum for separating, from the gases which have passed through the filter, particles of the liquid carried in suspension with the gases.

7. A dust separator for air and gases, comprising a casing adapted to contain a liquid in its lower portion and an inlet and an outlet for the air; rotatable filter elements mounted in said casing and adapted to pass through said liquid, said elements forming an air-tight joint with the end walls of said casing, and the gas being adapted to pass through the filter and the gas tight contact preventing leakage of gas around the filter; a ratchet and pawl mechanism for rotating said filter elements; and a screen for separating, from the gases which have passed through the filter, particles of the liquid carried in suspension with the gases.

In testimony whereof I affix my signature.

ANDERS JORDAHL.